(12) United States Patent
Portell et al.

(10) Patent No.: US 7,309,165 B2
(45) Date of Patent: Dec. 18, 2007

(54) BALL BEARING RETENTION APPARATUS

(75) Inventors: Patrick S. Portell, Pinckney, MI (US);
Boris I. Burgman, Oak Park, MI (US);
John A. Diemer, Farmington Hills, MI (US)

(73) Assignees: GM Global Technology Operations, Inc., Detroit, MI (US);
DaimlerChrysler AG, Stuttgart (DE);
DaimlerChrysler Corporation, Auburn Hills, MI (US)

( * ) Notice: Subject to any disclaimer, the term of this patent is extended or adjusted under 35 U.S.C. 154(b) by 329 days.

(21) Appl. No.: 11/187,618

(22) Filed: Jul. 22, 2005

(65) Prior Publication Data

US 2006/0062506 A1 Mar. 23, 2006

Related U.S. Application Data

(60) Provisional application No. 60/612,559, filed on Sep. 23, 2004.

(51) Int. Cl.
*F16C 43/04* (2006.01)
*F16D 13/68* (2006.01)

(52) U.S. Cl. ..................... 384/542; 192/115; 384/504; 384/519

(58) Field of Classification Search ............... 384/504, 384/506, 510, 512, 517, 519, 542; 192/110 B, 192/115
See application file for complete search history.

(56) References Cited

U.S. PATENT DOCUMENTS

| | | | |
|---|---|---|---|
| 4,730,946 A | * | 3/1988 | Cain .......................... 384/506 |
| 6,110,980 A | * | 8/2000 | Chen .......................... 62/620 |
| 6,367,980 B1 | * | 4/2002 | Kobayashi .................. 384/517 |

FOREIGN PATENT DOCUMENTS

| | | |
|---|---|---|
| DE | 69505039 | 9/1998 |
| DE | 102005037402 | 3/2003 |
| DE | 102005034654 | 3/2006 |
| DE | 102005035185 | 3/2006 |
| DE | 102005038925 | 3/2006 |

* cited by examiner

*Primary Examiner*—Thomas R. Hannon

(57) ABSTRACT

An improved hybrid transmission including two electric motor/generator modules and a plurality of planetary gear sets operatively connectable to the motor/generators and to an engine is provided. Novel structural and packaging schemes enhance the function and efficiency of the transmission. More precisely, the present invention relates to an improved apparatus for applying an adjustable load to internal rotating components of the hybrid transmission to maximize efficiency thereof.

19 Claims, 3 Drawing Sheets

BALL BEARING RETENTION APPARATUS

CROSS REFERENCE TO RELATED APPLICATIONS

This Application claims the benefit of U.S. Provisional Application 60/612,559, filed Sep. 23, 2004, which is hereby incorporated by reference in its entirety.

TECHNICAL FIELD

This invention relates to a ball bearing retention apparatus for a hybrid electro-mechanical vehicular transmission that utilizes interactive planetary gear arrangements that are operatively connected to an engine and two motor/generators.

BACKGROUND OF THE INVENTION

A hybrid electro-mechanical vehicular transmission utilizes interactive planetary gear arrangements that are operatively connected to an engine and two motor/generators. A power transmission in an electro-mechanical transmission is described in commonly owned United States Provisional Application entitled Electrically Variable Transmission with Selective Fixed Ratio Operation, attorney docket No. GP-305519, Holmes et al., filed Jul. 22, 2004, and hereby incorporated by reference in its entirety.

SUMMARY OF THE INVENTION

An improved hybrid transmission including two electric motor/generator modules and a plurality of planetary gear sets operatively connectable to the motor/generators and to an engine is provided. Novel structural and packaging schemes enhance the function and efficiency of the transmission. More precisely, the present invention relates to an improved apparatus for applying an adjustable load to internal rotating components of the hybrid transmission to maximize efficiency thereof.

The improved hybrid transmission includes a plurality of fasteners adapted to mount a clutch hub to a center support. Inner and outer runners disposed between the center support and the clutch hub preferably retain first and second ball bearings. An adjustable load applied to the ball bearings may be increased by tightening the fasteners such that the ball bearings remain on a consistent track, noise is minimized, and rotational efficiency is maximized.

In one aspect of the present invention, the inner runner includes a first portion engaged by the clutch hub and a second portion engaged by the center support.

In another aspect of the present invention, the first portion of said inner bearing runner includes a ramped shoulder adapted to engage the first ball bearing, and the second portion of the inner bearing runner includes a ramped shoulder adapted to engage the second ball bearing such that the ramped shoulders translate the adjustable load applied by the fasteners into a first component tending to draw the first and second ball bearings together and a second component tending to push the first and second ball bearings into engagement with the outer bearing runner.

In yet another aspect of the present invention, the fasteners include at least one hollow fastener adapted to provide hydraulic fluid to operate a clutch.

The above features and other features and advantages of the present invention are readily apparent from the following detailed description of the best modes for carrying out the invention when taken in connection with the accompanying drawings.

DESCRIPTION OF THE PREFERRED EMBODIMENTS

The present invention is adapted for use in conjunction with commonly owned U.S. Provisional Application 60/613,557, Burgman et al., filed Sep. 17, 2004, and hereby incorporated by reference in its entirety. It should, however, be appreciated that the present invention may also be used in other transmission configurations.

Figure 1:
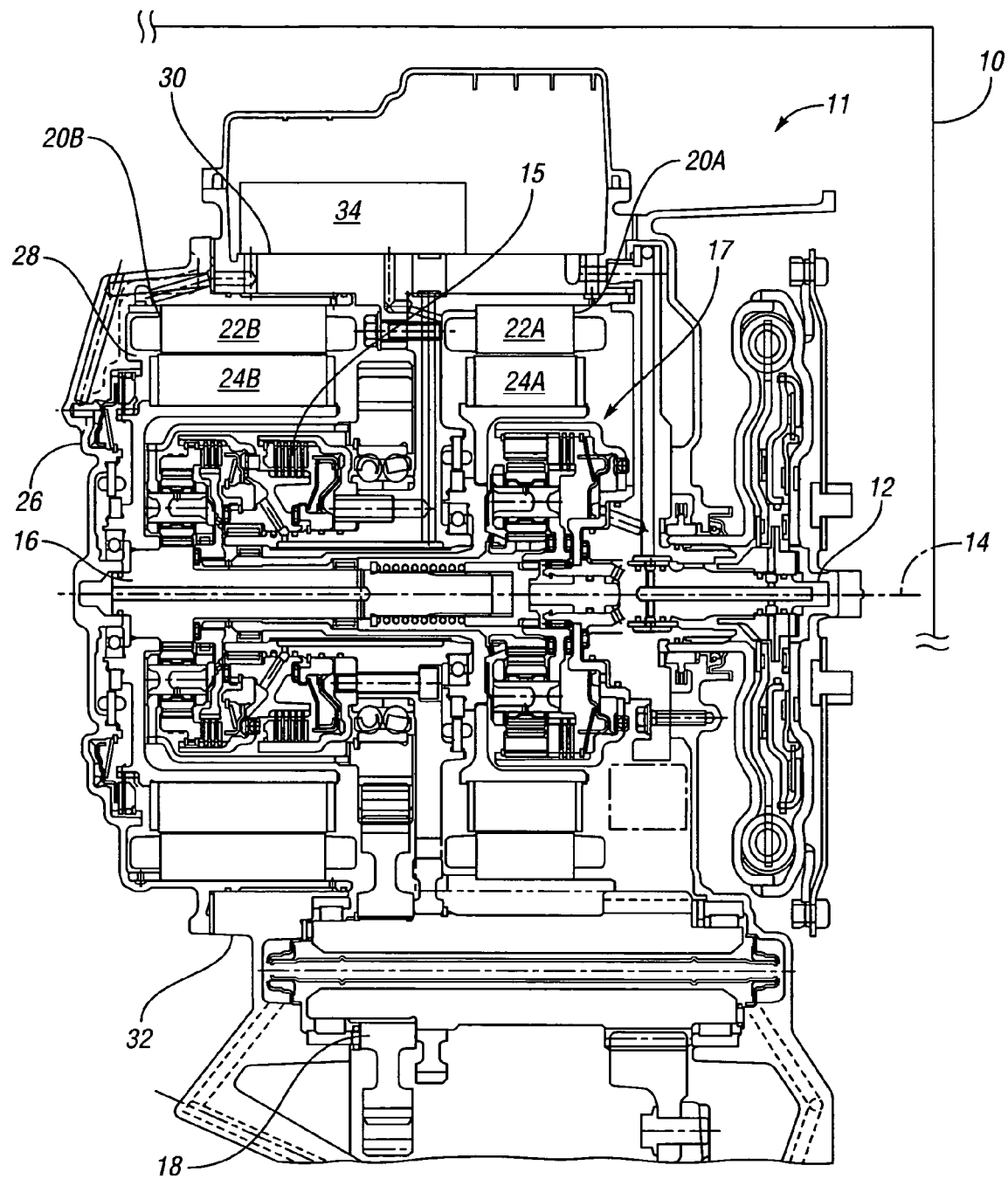
FIG. 1 is a schematic cross-sectional illustration in fragmentary view of a hybrid electrical/mechanical transmission.

Referring to the drawings wherein like reference numbers refer to like components, FIG. 1 shows a vehicle 10 having an electro-mechanical transmission 11. An input shaft 12 is disposed about a center axis 14 and is operable for transferring power from an engine (not shown) to the transmission 11. A main shaft 16 is longitudinally disposed and rotatable about the center axis 14 and is engageable with the input shaft 12. The engagement of one or more of a plurality of clutches such as clutch 15 interconnects one or more of a plurality of planetary gear sets such as planetary gear set 17 to transfer power at varying ratios to an output member 18. Two electric motor/generators 20A and 20B are coaxially oriented about the center axis 14. Each motor/generator 20A, 20B is operatively connectable to a member of one of the planetary gear sets to provide a range of continuously variable speed ratios between the input shaft 12 and the output member 18, as will be readily understood by those skilled in the art. Each of the motor/generators 20A, 20B includes a generally ring-shaped stator 22A, 22B, respectively, and a generally ring-shaped rotor 24A, 24B rotatable with respect to the respective stator 22A, 22B. An end cover 26 is mounted with respect to the main shaft 16 to partially encase the motor/generators 20A, 20B within and partially define an interior space 28. The end cover 26 cooperates with a first portion 30 of a housing member (i.e., an upper portion of a transmission case) and a second portion 32 of the housing member (i.e., a lower portion of the transmission case) to further encase the motors/generators 20A, 20B within the interior space 28.

Figure 2:
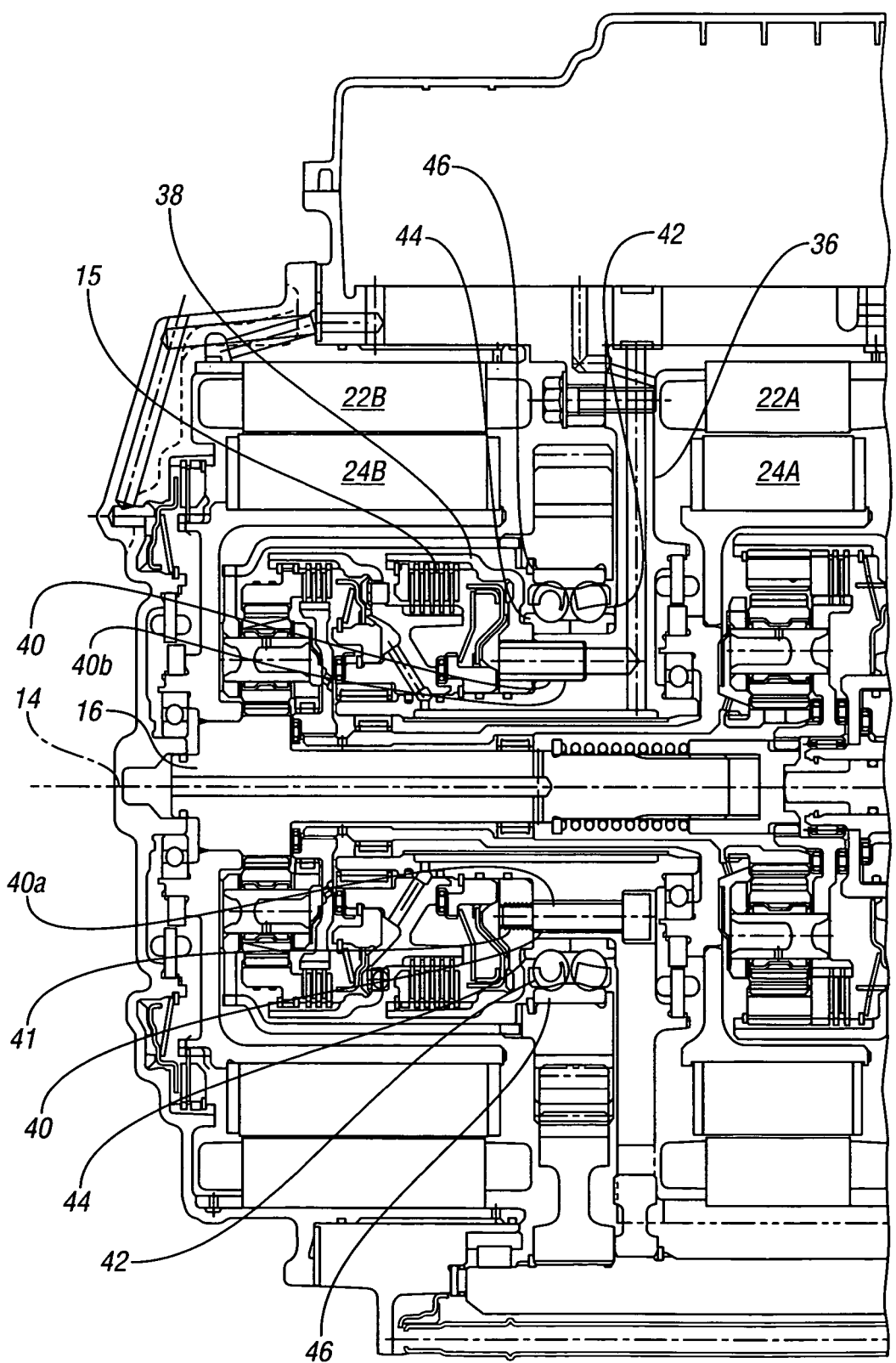
FIG. 2 is an enlarged schematic cross-sectional illustration in fragmentary view of a portion of the hybrid electrical/mechanical transmission of FIG. 1.

Referring now to FIG. 2, a center support 36 is rigidly supported with respect to the main shaft 16 about the center axis 14 and preferably supports the stator 22A. The clutch 15 is disposed within a housing or clutch hub 38 adapted to rotate about the center axis 14. The clutch hub 38 is mounted to the center support 36 by a plurality of fasteners 40. Rotation about the center axis 14 is facilitated by a ball bearing 42 retained by inner and outer bearing runners 44 and 46, respectively. The ball bearing 42 will hereinafter be described according to a preferred dual ball bearing embodiment, however, alternate configurations may be envisioned.

In a preferred embodiment there are five fasteners 40 evenly distributed in a circular pattern. For purposes of this disclosure, the present invention will be described in conjunction with the apparatus of the incorporated patent application 60/613,557, however, it should be appreciated that the present invention does not require the incorporated disclosure. Accordingly, four of the fasteners 40 are preferably solid fasteners 40*a* and one of the fasteners 40 is a hollow fastener 40*b* adapted to provide hydraulic fluid for the actuation of clutch 15. The four solid fasteners 40*a* each preferably include a threaded end portion 41 to maintain engagement between the clutch hub 38 and the center support 36, whereas the hollow fastener 40*b* is preferably press fit into position between the clutch hub 38 and the center support 36. While the number and configuration of fasteners 40 have been described in the context of a preferred embodiment, it should be appreciated that alternate quantities and configurations of the fasteners 40 may be envisioned, and that the fasteners 40 may include different combinations of fasteners 40*a* and/or 40*b*. Additionally, in an alternate embodiment the fasteners 40 may include solid fasteners 40*a* exclusively.

Figure 3:
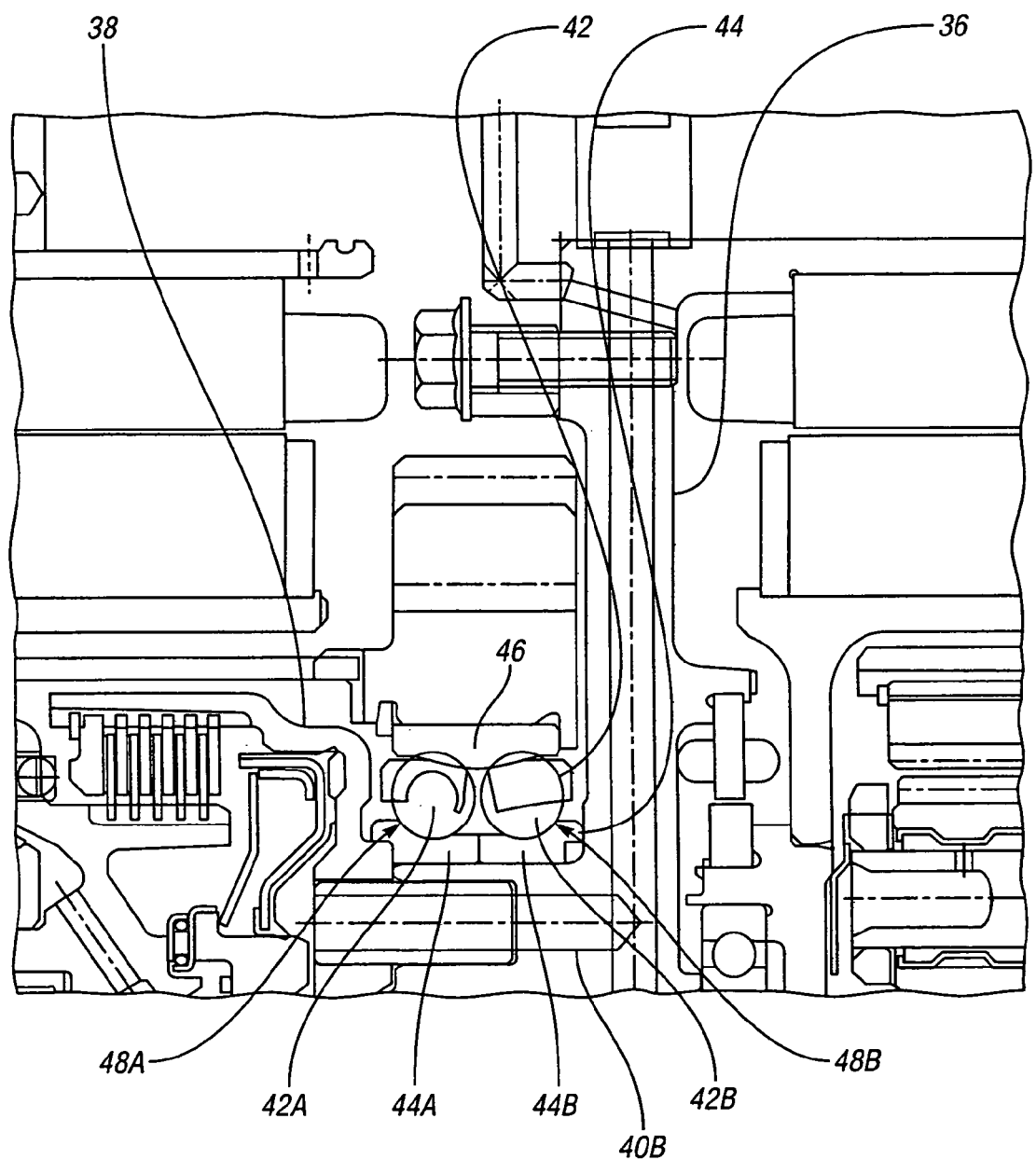
FIG. 3 is a further enlarged schematic cross-sectional illustration in fragmentary view of a portion of the hybrid electrical/mechanical transmission of FIG. 2.

As best seen in FIG. 3, according to the preferred dual ball bearing embodiment, ball bearing 42 includes a first ball bearing 42*a* and a second ball bearing 42*b*. The inner bearing runner 44 is split at the midpoint thereof about the center axis 14 (shown in FIGS. 1-2) to provide a first portion 44*a* and a second portion 44*b*. The first portion 44*a* of the inner bearing runner 44 is adapted to retain the first ball bearing 42*a*, and the second portion 44*b* of the inner bearing runner 44 is adapted to retain the second ball bearing 42*b*. The first and second portions 44*a*, 44*b* of the inner bearing runner 44 each include a ramped shoulder 48*a*, 48*b*, respectively.

The fasteners 40*a* (shown in FIG. 2) apply an axial load to the inner ball bearing runner 44 which is translated to the ball bearing 42. More precisely, as the fasteners 40*a* are tightened, the clutch hub 38 and center support 36 are drawn together such that the clutch hub 38 engages the first portion 44*a* of the inner bearing runner 44 and the center support 36 engages the second portion 44*b* of the inner bearing runner 44. Therefore, as the clutch hub 38 and center support 36 are drawn together, the first and second portions 44*a*, 44*b* of the inner bearing runner 44 are correspondingly drawn together. As the first and second portions 44*a*, 44*b* of the inner bearing runner 44 are drawn together, the shoulder 48*a* of the first portion 44*a* engages the ball bearing 42*a* and the shoulder 48*b* of the second portion 44*b* engages the ball bearing 42*b*. As the first and second ball bearings 42*a*, 42*b* are engaged, the geometry of the ramped shoulders 48*a*, 48*b* imparts both an axial load tending to draw the first and second ball bearings 42*a*, 42*b* together, and a radial load tending to push the first and second ball bearings 42*a*, 42*b* toward the outer bearing runner 46.

Accordingly, a variable load is imparted by the fasteners 40*a* to the first and second ball bearings 42*a*, 42*b* through the first and second portions 44*a*, 44*b* of the inner bearing runner 44. The variable load may be increased by tightening the fasteners 40*a* such that the first and second ball bearings 42*a*, 42*b* are compressed between the inner and outer bearing runners 44, 46. In this manner, the variable load applied to the first and second ball bearings 42*a*, 42*b* may be optimized such that the ball bearings remains on a consistent track, noise is minimized, and rotational efficiency is maximized.

While the best modes for carrying out the invention have been described in detail, those familiar with the art to which this invention relates will recognize various alternative designs and embodiments for practicing the invention within the scope of the appended claims.

The invention claimed is:

1. A vehicle transmission comprising:
   a center support;
   a clutch hub attached to said center support;
   at least one ball bearing disposed between said center support and said clutch hub; and
   a plurality of fasteners adapted to attach said clutch hub to said center support, wherein said plurality of fasteners are adjustable to apply a variable load to said at least one ball bearing such that an optimal bearing load may be selected to retain the ball bearing and maximize rotational efficiency.

2. The vehicle transmission of claim 1, wherein said at least one ball bearing comprises a first ball bearing and a second ball bearing.

3. The vehicle transmission of claim 2 further comprising inner and outer bearing runners adapted to retain said at least one ball bearing therebetween, whereby said variable load is applied by said plurality of fasteners to said inner bearing runner and then to said first and second ball bearings.

4. The vehicle transmission of claim 3, wherein said inner bearing runner includes a first portion in contact with said clutch hub and a second portion in contact with said center support.

5. The vehicle transmission of claim 4, wherein said first portion of said inner bearing runner includes a ramped shoulder adapted to engage the first ball bearing, and said second portion of said inner bearing runner includes a ramped shoulder adapted to engage the second ball bearing such that the ramped shoulders translate the variable load into a first component tending to draw the first and second ball bearings together and a second component tending to push the first and second ball bearings into engagement with the outer bearing runner.

6. The vehicle transmission of claim 5, wherein said plurality of fasteners include a plurality of solid threaded fasteners.

7. The vehicle transmission of claim 6, wherein said plurality of fasteners include at least one hollow fastener.

8. The vehicle transmission of claim 7, wherein said plurality of fasteners include five fasteners evenly distributed in a circular pattern.

9. A vehicle transmission comprising:
   a center support;
   a clutch hub attached to said center support;
   a first and second ball bearing disposed between said center support and said clutch hub;
   inner and outer bearing runners adapted to retain said first and second ball bearings therebetween; and
   a plurality of fasteners adapted to attach said clutch hub to said center support, wherein said plurality of fasteners are adjustable to apply a variable load to said first and second ball bearings such that an optimal bearing load may be selected to retain the ball bearings and maximize rotational efficiency.

10. The vehicle transmission of claim 9, wherein said inner bearing runner includes a first portion in contact with said clutch hub and a second portion in contact with said center support.

11. The vehicle transmission of claim 10, wherein said first portion of said inner bearing runner includes a ramped shoulder adapted to engage the first ball bearing, and said second portion of said inner bearing runner includes a ramped shoulder adapted to engage the second ball bearing such that the ramped shoulders translate the variable load into a first component tending to draw the first and second ball bearings together and a second component tending to push the first and second ball bearings into engagement with the outer bearing runner.

12. The vehicle transmission of claim 11, wherein said plurality of fasteners include a plurality of solid threaded fasteners.

13. The vehicle transmission of claim 12, wherein said plurality of fasteners include at least one hollow fastener.

14. The vehicle transmission of claim 13, wherein said plurality of fasteners include five fasteners evenly distributed in a circular pattern.

15. A vehicle transmission comprising:
   a center support;
   a clutch hub attached to said center support;
   an inner bearing runner axially disposed between said center support and said clutch hub, said inner bearing runner including:
      a first portion engaged by said clutch hub; and
      a second portion engaged by said center support;
   a first ball bearing in contact with said first portion of said inner bearing runner;
   a second ball bearing adjacent the first ball bearing and in contact with said second portion of said inner bearing runner;
   an outer bearing runner axially disposed between said center support and said clutch hub, and radially disposed about said inner bearing runner such that said first and second ball bearings are retained between the outer bearing runner and the inner bearing runner; and
   a plurality of fasteners adapted to attach said clutch hub to said center support, wherein said plurality of fasteners are adjustable to apply a variable load to said first and second ball bearings such that an optimal bearing load may be selected to retain the ball bearings and maximize rotational efficiency.

16. The vehicle transmission of claim 15, wherein said first portion of said inner bearing runner includes a ramped shoulder adapted to engage the first ball bearing, and said second portion of said inner bearing runner includes a ramped shoulder adapted to engage the second ball bearing such that the ramped shoulders translate the variable load into a first component tending to draw the first and second ball bearings together and a second component tending to push the first and second ball bearings into engagement with the outer bearing runner.

17. The vehicle transmission of claim 16, wherein said plurality of fasteners include a plurality of solid threaded fasteners.

18. The vehicle transmission of claim 17, wherein said plurality of fasteners include at least one hollow fastener.

19. The vehicle transmission of claim 18, wherein said plurality of fasteners include five fasteners evenly distributed in a circular pattern.

* * * * *